(12) United States Patent
Ernesti et al.

(10) Patent No.: US 11,932,237 B2
(45) Date of Patent: Mar. 19, 2024

(54) METHOD FOR ASSISTING A MANEUVERING PROCEDURE OF A MOTOR VEHICLE, AND SYSTEM FOR ASSISTING A MANEUVERING PROCEDURE OF A MOTOR VEHICLE

(71) Applicant: Volkswagen Aktiengesellschaft, Wolfsburg (DE)

(72) Inventors: Tilo Ernesti, Braunschweig (DE); Thorben Günzel, Braunschweig (DE); Daniel Mossau, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 390 days.

(21) Appl. No.: 17/202,135

(22) Filed: Mar. 15, 2021

(65) Prior Publication Data
US 2021/0197803 A1    Jul. 1, 2021

Related U.S. Application Data

(63) Continuation of application No. 16/010,933, filed on Jun. 18, 2018, now abandoned.

(30) Foreign Application Priority Data

Jun. 16, 2017   (DE) ...................... 10 2017 210 109.1

(51) Int. Cl.
*B60W 30/06*    (2006.01)
*B60W 30/00*    (2006.01)
(Continued)

(52) U.S. Cl.
CPC ............ *B60W 30/06* (2013.01); *B60W 30/00* (2013.01); *B62D 15/0285* (2013.01);
(Continued)

(58) Field of Classification Search
CPC .. B60W 30/06; B60W 30/00; B60W 2530/18; B60W 30/14; B60W 40/02;
(Continued)

(56) References Cited

U.S. PATENT DOCUMENTS 9,944,282 B1     4/2018  Fields et al.
10,169,994 B2 *  1/2019  Astigarraga ....... G01C 21/3492
(Continued)

FOREIGN PATENT DOCUMENTS

CN    103713290 A     4/2014    ............. G01S 15/88
DE    102008054533 A1 7/2009    ............. G01S 15/42
(Continued)

OTHER PUBLICATIONS

English translation of WO 2015062769 A1. Retrieved from https://worldwide.espacenet.com/patent/search/family/051429310/publication/WO2015062769A1?q=pn%3DWO2015062769A1 (Year: 2015).*
(Continued)

*Primary Examiner* — Calvin Cheung
(74) *Attorney, Agent, or Firm* — Slayden Grubert Beard PLLC

(57) ABSTRACT

A method for assisting a maneuvering procedure of a motor vehicle in a parking garage is disclosed, wherein the motor vehicle moves within the parking garage during the maneuvering procedure from a drop-off site in the parking garage to a predetermined position in the parking garage, wherein the maneuvering procedure of the motor vehicle is monitored by at least one sensor of the motor vehicle, comprising the steps: establishing a communication link between a controller of the motor vehicle and a vehicle-external unit of the parking garage; transmitting climate-specific measured data that are acquired by at least one measuring point in the parking garage from the at least one measuring point to the vehicle-external unit, and calibrating the at least one sensor
(Continued)

of the motor vehicle depending on the climate-specific measured data.

17 Claims, 1 Drawing Sheet

(51) Int. Cl.
| | |
|---|---|
| *B62D 15/02* | (2006.01) |
| *G01B 21/22* | (2006.01) |
| *G01C 9/00* | (2006.01) |
| *G01C 22/00* | (2006.01) |
| *G01S 7/52* | (2006.01) |
| *G01S 15/931* | (2020.01) |
| *G05D 1/00* | (2006.01) |
| *G08G 1/14* | (2006.01) |

(52) U.S. Cl.
CPC ............ *G01B 21/22* (2013.01); *G01C 9/00* (2013.01); *G01C 22/00* (2013.01); *G01S 7/52006* (2013.01); *G01S 15/931* (2013.01); *G05D 1/0088* (2013.01); *G05D 1/0212* (2013.01); *G05D 1/0255* (2013.01); *G05D 1/0282* (2013.01); *G08G 1/143* (2013.01); *G08G 1/146* (2013.01); *G01S 2015/932* (2013.01)

(58) Field of Classification Search
CPC ....... B60W 60/001; B60W 2050/0083; B60W 2420/54; B60W 2540/18; B60W 2555/20; B62D 15/0285; G01B 21/22; G01C 9/00; G01C 22/00; G01S 7/52006; G01S 15/931; G01S 2015/932; G05D 1/0088; G05D 1/0212; G05D 1/0255; G05D 1/0282; G05D 2201/0213; G08G 1/143; G08G 1/146; B60Y 2400/30
See application file for complete search history.

(56) References Cited

U.S. PATENT DOCUMENTS

| | | | |
|---|---|---|---|
| 2009/0168603 A1 | 7/2009 | Okuda et al. | 367/87 |
| 2014/0148992 A1 | 5/2014 | Shaffer et al. | 701/33.7 |
| 2016/0368489 A1 | 12/2016 | Aich et al. | 701/41 |
| 2017/0226764 A1 | 8/2017 | Nussbaum | |
| 2017/0305417 A1* | 10/2017 | Seurer | G08G 1/141 |
| 2018/0320609 A1* | 11/2018 | McQuillen | F01N 13/008 |

FOREIGN PATENT DOCUMENTS

| | | | | |
|---|---|---|---|---|
| DE | 102008008958 A1 | 8/2009 | | B60W 30/06 |
| DE | 102008054047 A1 | 5/2010 | | B60W 30/06 |
| DE | 102012222562 A1 | 6/2014 | | B60W 10/20 |
| DE | 102013219680 A1 | 6/2014 | | G01S 15/93 |
| DE | 102013201799 A1 | 8/2014 | | B60W 10/04 |
| DE | 102013203391 A1 | 8/2014 | | B60R 16/00 |
| DE | 102014112269 A1 | 3/2016 | | E04H 6/22 |
| DE | 102015106934 A1 | 11/2016 | | G01S 15/93 |
| DE | 102016111367 A1 | 12/2016 | | B60R 16/02 |
| JP | 2014106740 A | 6/2014 | | B60R 1/00 |
| KR | 20090055988 A | 6/2009 | | G06K 17/00 |
| KR | 20150044052 A | 4/2015 | | G06Q 50/30 |
| WO | 2015/062769 A1 | 5/2015 | | B60W 30/06 |

OTHER PUBLICATIONS

"Odometry sensors", retrieved from https://computersciencewiki.org/index.php/Odometry_sensor (Year: 2023).*
English translation of EP 3226028 A1 (Year: 2017).*
English translation of JP 2005011091 A (Year: 2005).*
"An Evaluation of the Bumper Standard—As Modified in 1982," NHTSA Technical Report, 143 Pages, Feb. 1987.
German Office Action, Application No. 102017210109.1, 5 pages, dated Feb. 26, 2018.
Extended European Search Report, Application No. 18173828.7, 8 pages, dated Nov. 14, 2018.

* cited by examiner

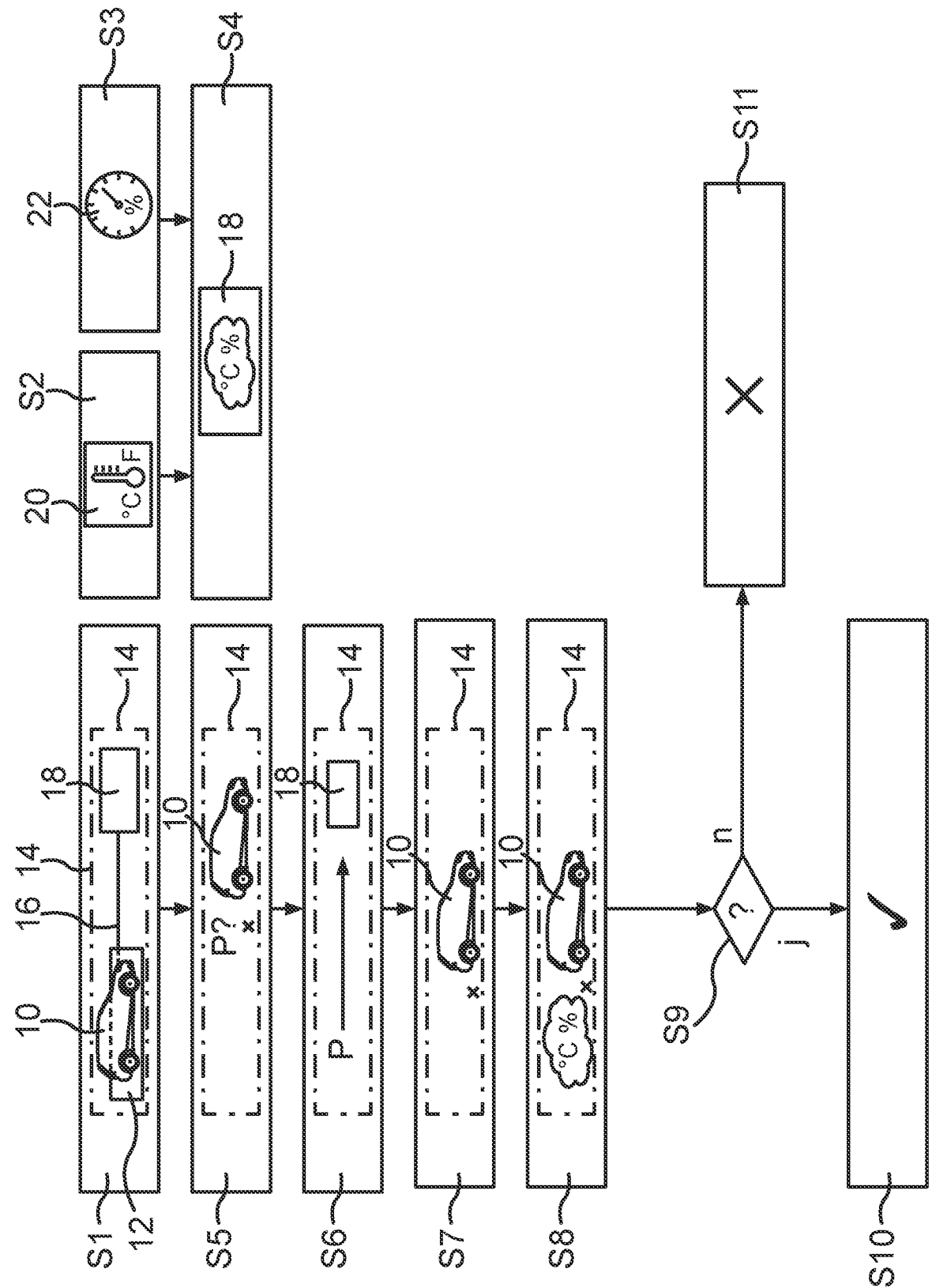

METHOD FOR ASSISTING A MANEUVERING PROCEDURE OF A MOTOR VEHICLE, AND SYSTEM FOR ASSISTING A MANEUVERING PROCEDURE OF A MOTOR VEHICLE

CROSS-REFERENCE TO RELATED APPLICATIONS

This application is a continuation of U.S. non-provisional patent application Ser. No. 16/010,933, filed on Jun. 18, 2018 with the United States Patent and Trademark Office, the latter of which claims priority to DE Application No. 10 2017 210 109.1 filed Jun. 16, 2017, the contents of which applications are hereby incorporated by reference in their entirety.

TECHNICAL FIELD

The invention relates to a method for assisting a maneuvering procedure of a motor vehicle in a parking garage.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A plurality of driver assistance systems use sensors, in particular ultrasonic sensors for ascertaining distances from the motor vehicle to objects in an environment of the motor vehicle. A driver assistance system may be for example a reverse parking system and/or park assist.

Ultrasonic sensors function according to the echo sounding principle. In so doing, the ultrasonic sensors transmit brief ultrasonic pulses that are reflected by the objects in the environment of the motor vehicle. After transmitting the ultrasonic pulse, the ultrasonic sensors then receive the reflected signals, or respectively ultrasonic pulses. Typically, the ultrasonic sensors are used both for transmitting as well as for receiving the ultrasonic pulses. By using the propagation time between transmitting the ultrasonic pulse and receiving the reflected ultrasonic pulse and the speed of sound of the ultrasonic pulse in air, the distances from the motor vehicle to the object are ascertained by the ultrasonic sensor, in particular by a control unit of the ultrasonic sensor or the motor vehicle. The speed of sound depends on temperature. Consequently to precisely measure distance by means of the ultrasonic sensor, it is important to know the temperature in the environment of the motor vehicle.

Motor vehicles themselves may have a temperature sensor or a temperature probe by means of which the ultrasonic sensor can be adjusted. The problem with temperature probes installed in the vehicle is that, during transitions from areas with a high environmental temperature to a low environmental temperature or vice versa, or when the motor temperatures of the motor vehicle are high, the temperature probe must first adjust to reliably acquire the temperature in the environment, or it supplies incorrect measuring results, for example when the engine temperatures are too high.

SUMMARY

An object exists to improve a method and a system for assisting a maneuvering procedure of a motor vehicle, in particular with regard to the reliability of the at least one sensor of the motor vehicle.

This object is solved by a method for assisting a maneuvering procedure of a motor vehicle, as well as by an associated system having the features of the independent claims. Embodiments of the invention are discussed in the dependent claims and the following description.

BRIEF DESCRIPTION OF THE DRAWINGS

In the following, the present invention will be explained in greater detail on the basis of various embodiments. In the FIG., an embodiment of the method for assisting a maneuvering procedure of a motor vehicle in a parking garage is explained.

DETAILED DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In one exemplary aspect and during the maneuvering procedure, the motor vehicle moves within the parking garage from a drop-off site to a predetermined position within the parking garage. The maneuvering procedure of the motor vehicle is monitored by at least one sensor of the motor vehicle. The present aspect also relates to a system for assisting a maneuvering procedure of a motor vehicle.

In another exemplary aspect of a method for assisting a maneuvering procedure of a motor vehicle in a parking garage, the motor vehicle moves within the parking garage during the maneuvering procedure from a drop-off site in the parking garage to a predetermined position within the parking garage. "Maneuvering procedure" for example means a parking procedure or process of the motor vehicle, in particular entering a parking space and/or leaving a parking space, and/or a maneuvering procedure of the motor vehicle. During the maneuvering procedure, the motor vehicle can autonomously, or fully automatically, or partially autonomously be moved from the drop-off site to the predetermined position. Alternatively, the driver of the motor vehicle can also move from the drop-off site to the predetermined position. In other words, the motor vehicle can be manually maneuvered by the driver. For example, the driver can perform a manual parking procedure or a manual maneuvering procedure as the manual maneuvering procedure.

The "drop-off site" may in some embodiments be a position at which a driver of the motor vehicle has dropped off the motor vehicle, or has gotten out of the motor vehicle. If the driver of the motor vehicle performs the maneuvering procedure with the motor vehicle, the "drop-off site" can also be a position from where the driver of the motor vehicle steers or drives to a predetermined position. The "predetermined position" may in some embodiments be in particular a parking spot or a parking space. Alternatively, the "drop-off site" may also be a predetermined parking position, or a parking spot, or a parking space in the parking garage. The "predetermined position" may be a different position from the drop-off site in the parking garage such as a loading area or an unloading area, or another parking position, or a position at which the driver of the motor vehicle gets back into the motor vehicle, or a loading position at which there is a loading station for the motor vehicle.

During the maneuvering procedure of the motor vehicle, the motor vehicle may in corresponding embodiments be monitored by at least one sensor of the motor vehicle. The motor vehicle may in some embodiments also have more than one sensor, i.e., a plurality of sensors. The at least one sensor of the motor vehicle for monitoring the maneuvering procedure may in some embodiments be an ultrasonic sensor. The at least one sensor may ensure that the motor vehicle can reliably move within the parking garage.

In some embodiments of the present method, a communication link is established between a controller of the motor vehicle and a vehicle-external unit of the parking garage. The vehicle-external unit can for example be a server apparatus. The controller of the motor vehicle and/or the at least one sensor of the motor vehicle can be a part or component of a driver assist system of the motor vehicle. The "communication link" may in some embodiments be a wireless link by means of which the controller of the motor vehicle can communicate with the vehicle-external unit of the parking garage, in particular can exchange or transfer data. In some embodiments, the communication link is a WLAN/Wi-Fi link, i.e., a wireless local area network or a wireless local network In some embodiments of the present method, climate-specific measured data that are acquired by at least one measuring point in the parking garage are transmitted from the at least one measuring point to the vehicle-external unit. "Climate-specific measured data" may be climate data, such as a temperature and/or a humidity, in particular in an environment of the motor vehicle. To acquire the temperature, the at least one measuring point may in some embodiments have a temperature measuring device such as a thermometer. To acquire the humidity, the at least one measuring point may have a humidity measuring device such as a hygrometer. By means of the devices, the measuring point can provide climate-specific measured data in a particularly easy and reliable manner.

In some embodiments of the present method, the at least one sensor of the motor vehicle is calibrated depending on the climate-specific measured data. In other words, the at least one sensor of the motor vehicle can be set, or adapted, or adjusted depending on the climate-specific measured data.

Some embodiments are based on the insight that the sound pressure of the reflected ultrasonic pulse is only acquired after a certain or predetermined strength of the signal after reflection, in particular in an ultrasonic sensor. In order to be able to reliably acquire the signal, the at least one sensor is adjusted to be more sensitive at high temperatures than at low temperatures. When calibrating the at least one sensor and in corresponding embodiments, a sensor sensitivity, in particular a reception sensitivity of the at least one sensor and/or at least one parameter of the sensor, in particular a transmission sound pressure of the sensor and/or a value of the speed of sound can be adapted.

By arranging the at least one measuring point in the parking garage, climate-specific measured data may be acquired on-site for the maneuvering procedure of the motor vehicle within the parking garage, and the at least one sensor of the motor vehicle that monitors or assists the maneuvering procedure can hence be adjusted particularly precisely. The motor vehicle can hence be maneuvered particularly reliably within the parking garage.

In some embodiments, the motor vehicle is in an autonomous or fully-automated driving mode during the maneuvering procedure. In other words, the motor vehicle is operated autonomously or fully-automated during the maneuvering procedure, in particular by means of the motor vehicle controller. The controller may for example be an electronic circuit. In this context, "autonomous driving mode" may, e.g., mean that the motor vehicle moves independently. In autonomous driving mode, there can be no vehicle operator, or no active vehicle operator, i.e., driver, in the motor vehicle, or only passengers can be in the motor vehicle. In autonomous driving mode, the driver of the motor vehicle therefore does not have to concern himself with the further operation of the motor vehicle. During the maneuvering procedure in autonomous driving mode, the motor vehicle is moved autonomously from the drop-off site to the predetermined position, in particular by the motor vehicle controller. For example, the motor vehicle can drive autonomously in the parking garage, or to the parking space from the drop-off site to the predetermined position, in particular a parking position, and for example park there. In addition or alternatively, the motor vehicle can be configured to drive from the predetermined position back to the drop-off site. The maneuvering procedure can therefore comprise entering a parking space, i.e., autonomous driving from the drop-off site to the predetermined position, and/or leaving a parking space from the predetermined position to the drop-off site.

Further embodiments provide that a current position of the motor vehicle is determined during the maneuvering process, and the current position of the motor vehicle is transferred to the vehicle-external unit, wherein the climate-specific measured data acquired by the at least one measuring point is assigned to the current position of the motor vehicle. In some embodiments, the parking garage has a plurality of measuring points for this. During the maneuvering procedure, a current position of the motor vehicle is acquired, e.g., continuously, i.e., at predetermined intervals in time. Depending on the current position of the motor vehicle, a measuring point of the plurality of measuring points can be assigned to this position. Here, "assign" may, e.g., mean that a current position is assigned one or more measuring points that are in particular closest to the current position of the motor vehicle. If the motor vehicle is for example between two measuring points, the climate-specific measured data for this position can be interpolated depending on the current position. In other words, position-related or location-dependent climate-specific measured data can be acquired, and/or evaluated, and/or determined for the motor vehicle, in particular for the at least one sensor of the motor vehicle. By determining the climate-specific dependency of the measured data on the current position of the motor vehicle, precision of the detection of the climate-specific measured data can be increased, and hence reliability of the at least one sensor of the motor vehicle.

The climate-specific measured data can be evaluated by the vehicle depending on a current position of the motor vehicle, i.e., on the part of the motor vehicle, or by the parking garage, i.e., on the part of the parking garage. In some embodiments, the climate-specific measured data acquired by the measuring points are assigned by the vehicle-external unit to the current position of the motor vehicle and transferred to the motor vehicle.

Alternatively and according to further embodiments, the vehicle-external unit can assign the climate-specific measured data acquired by the at least one measuring point or measuring points to the current position of the motor vehicle and transfer said data to the motor vehicle, in particular by the vehicle-external unit. Alternatively and according to further embodiments, the vehicle-external unit can transfer the climate-specific measured data acquired by the measuring points to the motor vehicle, and the controller of the motor vehicle can assign the climate-specific measured data to the current position of the motor vehicle. Depending on the evaluation of the climate-specific measured data by the vehicle or by the parking garage, the climate-specific measured data can be evaluated relative to the position, i.e., depending on the site or the location at which the motor vehicle is located.

In some embodiments, the predetermined position is determined by the vehicle-external unit and transferred to the motor vehicle, in particular the controller of the motor vehicle, wherein based on the predetermined position, the controller determines a trajectory from the drop-off site to the predetermined position along which the motor vehicle is guided to the predetermined position. "Trajectory" may, e.g., mean a trajectory or a path or a way or route along which the motor vehicle moves. In other words, the vehicle-external unit can be configured to determine the target position or predetermined position to which the motor vehicle must move, and transfer or specify said position to the motor vehicle, in particular to the controller of the motor vehicle. For example, the vehicle-external unit may identify a parking space or a parking spot for the motor vehicle. The controller of the motor vehicle may then plan a trajectory from the drop-off site to the predetermined position. Then, the controller can be configured to control a motor vehicle such that the motor vehicle automatically travels along the trajectory. During the trip or maneuvering process of the motor vehicle from the drop-off site to the predetermined position, objects can be acquired in an environment of the motor vehicle by means of the at least one sensor. Once an object is or has been acquired that is located on the planned trajectory, the trajectory around the object can be planned, in particular by the controller of the motor vehicle. If this is impossible, the motor vehicle in some embodiments brakes to a standstill and reports the disruption for example to the vehicle-external unit of the parking garage.

In a further aspect, a system for assisting a maneuvering procedure of a motor vehicle in a parking garage is described, wherein the motor vehicle moves within the parking garage during the maneuvering procedure from a drop-off site in the parking garage to a predetermined position in the parking garage, wherein at least one sensor of the motor vehicle is configured to monitor the maneuvering procedure of the motor vehicle. The system comprises a controller of the motor vehicle that is configured to establish a communication link to a vehicle-external unit of the parking garage. Furthermore, the system comprises at least one measuring point in the parking garage that is configured to acquire climate-specific measured data and transfer or transmit said measured data to the vehicle-external unit. The controller of the motor vehicle is furthermore configured to calibrate the at least one sensor of the motor vehicle depending on climate-specific measured data.

In some embodiments, the at least one measuring point has at least one temperature measuring device and/or at least one humidity measuring device. The measuring point may for example have a thermometer as the temperature measuring device. To measure the humidity, the humidity measuring device may for example be designed as a hygrometer. The climate in the parking garage, in particular the temperature and/or the humidity, may be determined or evaluated very reliably by such devices.

The present aspect is based on the insight that different temperatures can arise in the parking garage due to different air temperatures such that the temperature can be lower in particular on the same floor or level of the parking garage, such as in the area of the floor of the parking garage, than in the area of the ceiling. This occurs for example because hot air rises upward. In order to be able to reliably operate the at least one sensor at the installation height of the at least one sensor, some embodiments provide that the at least one measuring point in the parking garage is arranged at an installation height between 300 mm and 500 mm from the floor of the parking garage on which the motor vehicle moves. In other words, the at least one measuring point can be arranged between 300 mm and 500 mm above the floor of the parking garage in these embodiments. If the measuring point is arranged within such a range, the measuring point may be located at the height of the at least one sensor installed in the motor vehicle. Given the installation height of the measuring points adapted to the sensor of the motor vehicle, the evaluation of the climate-specific data refers to the precise area of use of the sensor in the motor vehicle, whereby reliability and/or precision of the sensor can be further increased.

According to further embodiments, the drop-off site is located in an area of the parking garage segregated from the remaining parking garage, wherein the parking garage is designed as a parking garage that is closed to the environment, wherein the at least one measuring point is located within the segregated area. "Segregated area", e.g., means a closed room within the parking garage. In other words, the drop-off site is located in a non-public segregated area of the parking garage. Motor vehicles can enter this area for example only through a lock. The lock may in some embodiments have at least two accesses, wherein the motor vehicle can drive into the lock through one of the accesses and leave via the second access of the lock. The accesses can for example be designed as a rolling gate or door. The lock may be beneficial since the air exchange is slight in such an area, and the temperature and/or humidity accordingly does not change abruptly within this area. Moreover, it is possible to work with significantly fewer measuring points for the temperature and/or humidity measurement. In some embodiments, the system has a plurality of measuring points, wherein at least one measuring point is located within the lock, one is located in the middle of the area, and one is located at the point most distant from the lock. If there are other accesses to the segregated area, for example through one or more doors, they may in corresponding embodiments also be equipped with at least one measuring point.

In some embodiments, the system furthermore has an acquisition apparatus that is configured to acquire a current position of the motor vehicle, wherein the acquisition apparatus is furthermore configured to transmit the acquired current position of the motor vehicle to the vehicle-external unit. For example, the acquisition apparatus to acquire the current position of the motor vehicle may be arranged on the motor vehicle. The acquisition apparatus may thus for example have an odometry sensor to acquire the current position of the motor vehicle. In other words, the acquisition apparatus can acquire a stretch traveled by the motor vehicle, or movement of the motor vehicle on the basis of odometry. In other words, the current position of the motor vehicle can be evaluated by means of odometry. Since in particular the drop-off site from which the motor vehicle moves to the predetermined position within the parking garage is known, the traveled stretch proceeding from the drop-off site can be determined based on odometry, i.e., a movement of the wheels of the motor vehicle. In addition or alternatively and in some embodiments, the acquisition apparatus for acquiring the current position of the motor vehicle can have a steering wheel angle sensor. The steering wheel angle sensor measures the turning angle of the steering wheel, i.e., the steering angle. In some embodiments, the acquisition apparatus can be configured to evaluate the steering angle and the movement of the wheels of the motor vehicle. A trajectory of the motor vehicle may be ascertained or determined by means of the acquired steering angle and/or the acquired movement of the wheels of the motor vehicle. With the assistance of the acquisition apparatus, the current position of the motor vehicle can be determined particularly precisely and reliably.

In some embodiments, the acquisition apparatus is furthermore configured to determine the level of the parking garage on which the motor vehicle is located, wherein the acquisition apparatus has an tilt sensor of the motor vehicle to determine the level of the parking garage. The parking garage may, e.g., a multistory parking garage. Since the controller of the motor vehicle is in some embodiments configured to determine a trajectory from the drop-off site to the predetermined position, the level or floor on which the motor vehicle is located can be determined with the assistance of the trajectory and the tilt angle sensor of the motor vehicle. Once the motor vehicle drives up or down a level in a multi-floor parking garage, this can be acquired by the tilt sensor of the motor vehicle.

In some embodiments, the system according to the present aspect has one or more features as described in conjunction with the previous aspect, i.e., the method as described in the preceding. For this reason, the corresponding embodiments are not again described but incorporated herein.

In the following, further exemplary embodiments are described. In this regard, the FIG. shows a schematic flow chart with individual method steps of an embodiment of a method for assisting a maneuvering procedure of a motor vehicle.

It is noted that in the exemplary embodiments, the described components represent individual features that may be considered independent of each other, and should therefore be considered as a part of the disclosure both individually or in other than the portrayed combination. In addition, the described embodiments may certainly also be supplemented by other features or embodiments than those described, such as the features and embodiments described in the preceding.

In the FIG., the method steps of an embodiment of a method for assisting a maneuvering procedure of a motor vehicle in a parking garage are explained.

A driver of a motor vehicle 10 that in particular is designed as a passenger car drops off the motor vehicle 10 at a drop-off site 12 within a parking garage 14. The driver leaves the motor vehicle 10 at the drop-off site 12. The motor vehicle 10 is switched by the driver to autonomous driving mode at the drop-off site 12, in particular for a subsequent maneuvering procedure of the motor vehicle 10, or driving maneuver of the motor vehicle 10 to be performed. In other words, the motor vehicle 10, in particular a controller in the motor vehicle 10, executes an autonomous or fully-automated maneuvering procedure in the parking garage 14. "Maneuvering procedure" in this embodiment may mean a parking procedure, i.e., the autonomous driving of the motor vehicle 10 along a predetermined stretch from the drop-off site 12 to a predetermined position, i.e., a parking space, or an autonomous leaving of a parking space, i.e., autonomously driving or maneuvering the motor vehicle 10 from the predetermined position, i.e., a parking spot, to the drop-off site 12.

Once the motor vehicle 10 is located at the drop-off site 12 or in the parking garage 14, the motor vehicle 10, in particular a controller (not shown in the FIG.) of the motor vehicle 10 is configured to create or produce a communication link 16 with a vehicle-external unit 18 in the parking garage 14. The vehicle-external unit 18 is for example a server unit or a processing unit. In a first method step S1, a communication link between the motor vehicle 10 and the vehicle-external unit of the parking garage 18 is established in the parking garage 14. The communication link 16 may be a bidirectional link, i.e., data can be transmitted or transferred from the motor vehicle 10 to the vehicle-external unit 18, and from the vehicle-external unit 18 to the motor vehicle 10. For example, a WLAN/Wi-Fi link can for example create the communication link 16. In other words, the motor vehicle 10 or the controller of the motor vehicle 10 can establish a link to the vehicle-external unit 18, in particular via a WLAN/Wi-Fi link.

Once the communication link 16 is established between the motor vehicle 10 and the vehicle-external unit 18, the vehicle-external unit 18 transfers to the motor vehicle 10 the predetermined position, in particular at which the motor vehicle 10 is supposed to park. The vehicle-external unit 18 is therefore configured to assist with automatically dropping off and providing the motor vehicle. So that the motor vehicle 10 can be guided to the predetermined position for the automatic maneuvering procedure, the controller of the motor vehicle 10 is configured to plan, or determine, or calculate the trajectory from the drop-off site 12 or the transfer point, to the predetermined position. Then the motor vehicle 10 is configured to automatically drive the trajectory.

At least one measuring point is arranged in the parking garage, i.e., in the parking garage 14. In some embodiments, the parking garage 14 also has a plurality of measuring points. The measuring points are configured to acquire climate-specific parameters within the parking garage 14, in particular within a parking garage interior. In some embodiments, the measuring points are arranged distributed within the parking garage 14. The climate-specific parameters or data can be acquired by the measuring points at different points in the parking garage 14, and/or on the different levels of the parking garage 14. Each measuring point has a least one temperature measuring device 20 and one humidity measuring device 22. The temperature measuring device 20 is configured to acquire a temperature in an environment of the measuring point. The measuring point can for example have a thermometer as the temperature measuring device 20. The humidity measuring device 22 is configured to acquire a humidity in an environment of the measuring point. The measuring point can for example have a hygrometer as the humidity measuring device 22. Instead of using a plurality of humidity measuring devices, in addition or alternatively the parking garage 14 can have an air-conditioning system that is configured to air-condition the parking garage 14 and hence to specify or set a humidity value for the interior of the parking garage 14. The value of the humidity within the parking garage 14 is known from the humidity value set by the air-conditioning system. If an air-conditioning system is used in the parking garage, the parking garage 14 is designed as a closed parking garage so that an air exchange in the interior of the parking garage 14 is only possible by means of the air conditioning system.

In a second method step S2 and a third method step S3, temperature and humidity are measured as the climate-specific measured data or parameters by means of the temperature measuring devices and humidity measuring devices. The climate-specific measured data are acquired continuously, i.e., at regular intervals over time. The at least one measuring point or the plurality of measuring points are configured to transfer the acquired climate-specific measured data to the vehicle-external unit 18. In another method step S4, the vehicle-external unit 18 is configured to receive and/or evaluate the climate-specific measured data.

So that the motor vehicle 10 can autonomously or automatically execute the maneuvering procedure, the motor vehicle 10 is assisted by at least one sensor. The at least one sensor is designed as an ultrasonic sensor and is arranged on the motor vehicle 10. The motor vehicle 10 can also have a plurality of sensors, in particular a plurality of ultrasonic sensors in some embodiments.

The at least one sensor, i.e., the ultrasonic sensor, may be a part of a driver assistance system of the motor vehicle 10. The driver assistance system can have the at least one ultrasonic sensor and the controller of the motor vehicle 10. The controller can for example be formed by an electronic control unit (ECU) of the motor vehicle 10.

In some embodiments, the motor vehicle 10 has eight ultrasonic sensors. Four ultrasonic sensors can be arranged in a front area of the motor vehicle 10, and four ultrasonic sensors can be arranged in a rear area of the motor vehicle 10. The ultrasonic sensors are designed to acquire an object in an environment of the motor vehicle 10. Moreover, the ultrasonic sensors are used to determine a distance between the object and the motor vehicle 10. The ultrasonic sensors are connected to the controller for data transmission.

During the maneuvering procedure of the motor vehicle 10, i.e., the drive from the drop-off site 12 to the predetermined position, the driver assistance system of the motor vehicle 10 acquires objects by means of the installed ultrasonic sensors. Once an object has been recognized that is located on the planned trajectory, the trajectory is planned around the object. If this is impossible, the motor vehicle 10 brakes to a standstill and reports the disruption to the vehicle-external unit 18 of the parking garage 14.

The at least one ultrasonic sensor or the plurality of ultrasonic sensors of the motor vehicle 10 is operated depending on the temperature and/or the humidity in the environment of the motor vehicle 10. In order to be able to perform the maneuvering procedure in the parking garage 14 particularly safely and reliably, it may be beneficial to adapt the at least one sensor or the ultrasonic sensors depending on the current temperature and/or humidity in the environment of the motor vehicle 10. Depending on where the motor vehicle 10 is located in the parking garage 14, there can be different temperatures or values of the humidity. Alternatively as already explained above, the parking garage 14 can be designed as a closed parking garage 14. In this case, the temperature and/or the humidity in the parking garage 14 is nearly constant. In this case, at least one measuring point may be sufficient. However, in order to increase the precision of the acquired temperature and humidity values within the parking garage 14, two measuring points are arranged distributed within the parking garage 14. Depending on the current position P of the motor vehicle 10, a current climate-specific measured value or parameter can be provided, depending on the position, for adapting the at least one sensor or plurality of sensors of the motor vehicle 10.

For this, in a method step S5, a current position P of the motor vehicle 10 may be acquired. For example, the current position P of the motor vehicle 10 can be acquired with the assistance of an acquisition apparatus such as an odometry sensor, or a steering wheel angle sensor, or an environmental acquisition apparatus such as a camera. Since the trajectory is known, the controller of the motor vehicle 10 can ascertain or determine the current position P of the motor vehicle 10 relative to the drop-off site 12 by using the acquired values from the acquisition apparatus during the driving maneuver, i.e., while driving the trajectory.

The controller of the motor vehicle 10 can be configured to transfer the current position P of the motor vehicle 10 to the vehicle-external unit 18 in another method step S6.

Subsequently in another method step S7, the vehicle-external unit 18 can be configured to assign the climate-specific measured data or parameters acquired by the measuring points to the current position P of the motor vehicle 10. In other words, the vehicle-external unit 18 of the parking garage 14 can be configured to ascertain via interpolation the climate-specific measured data at each location at which the measuring points are arranged within the parking garage 14, or at least within a specific area in which the automatic driving maneuver is performed, i.e., in particular in which the automatic vehicle drop-off/providing function is executed. The vehicle-external unit 18 of the parking garage 14 can hence be configured to determine the current temperature and/or humidity at the position P of the motor vehicle 10 and, in another method step S8, to transfer the position-related climate-specific measured data to the motor vehicle. The climate-specific measured data are transferred to the motor vehicle 10 to calibrate the at least one sensor, and/or the plurality of sensors of the motor vehicle 10.

Instead of the climate-specific measured data being evaluated depending on the current position P of the motor vehicle by means of the vehicle-external unit 18, alternatively, the climate-specific measured data can be evaluated in the vehicle depending on the current position P of the motor vehicle 10, for example by means of the controller of the motor vehicle 10. For this, the current position P of the motor vehicle 10 may be acquired with the assistance of the acquisition apparatus of the motor vehicle 10. Furthermore, the climate-specific measured data from all or the at least one measuring point may be transferred by the vehicle-external unit 18 to the motor vehicle 10 via the communication link 16. The controller of the motor vehicle 10 is subsequently configured to assign or associate the received climate-specific measured data with the current position P of the motor vehicle 10. In other words, the vehicle-external unit 18 as well as the controller of the motor vehicle 10 can also be configured to associate the closest measuring point with the current position P of the motor vehicle 10, and to use the climate-specific measured data acquired by the closest measuring point for calibrating the at least one sensor and/or the plurality of sensors of the motor vehicle 10.

In another method step S9, it is checked whether the temperature and/or the humidity, i.e., the climate-specific measured data have changed at the current position P of the motor vehicle 10. If the controller of the motor vehicle 10 or the vehicle-external unit 18 acquires that climate-specific measured data at the current position P have changed in comparison to the previous position of the motor vehicle 10 (j), the at least one sensor, i.e., the ultrasonic sensor, or the plurality of sensors of the motor vehicle 10 is calibrated or adapted in another method step S10. When the sensor is being calibrated, the controller of the motor vehicle 10 is configured to adapt the distance measurement by the sensor to the current position of the motor vehicle 10 using the current climate-specific measured data. The adaptation comprises for example the reception sensitivity, the transmission sound pressure and/or the value of the temperature-dependent speed of sound for ascertaining the distance.

If it is found in the review step S9 that the temperature and/or the humidity, i.e., the climate-specific measured data have not changed (n) at the current position P of the motor vehicle, the at least one sensor or the plurality of sensors of the motor vehicle 10 are not adapted or calibrated in another method step S11.

Overall, the examples show how a method and a device or a system is provided for ascertaining the air temperature and humidity in a parking garage, in particular for assisting an autonomous parking procedure of a motor vehicle in the parking garage.

According to another embodiment, an assistance system is provided based on ultrasonic sensors that automatically parks the motor vehicle exclusively in a parking garage or in a specific segregated area in the parking garage from a predetermined position, i.e., a drop-off site and automatically provides said motor vehicle at another time to this drop-off site.

In so doing, it may be beneficial to use a method that determines the temperature and humidity in the environmental air in the parking garage, and provides this information (temperature and/or humidity) to the ultrasound-based assistance system in order to correspondingly adapt it with the assistance of this information with regard to the distance measurement (speed of sound and/or airborne sounded dissipation).

For this and in further embodiments, the following steps may be conducted: First the temperature and/or the humidity of the air is determined in the area of the parking garage in which the motor vehicle assistance system is used at different measuring points in the parking garage. In so doing, the results of the temperature and humidity measurement at the different measuring points are continuously transferred to a vehicle-external unit of the parking garage, for example a processing unit of the parking garage. For example, the data or information on the temperature and/or humidity at the measuring points can be transferred within the parking garage via WLAN/WiFi to a server or a server apparatus of the parking garage as a vehicle-external unit. In a method step of the method, safe communication between the motor vehicle and the processing unit of the parking garage is established at the drop-off site, for example a WLAN/WiFi link or via mobile communications. Then a current position of the motor vehicle is determined by using odometry and environmental sensors. In another method step, the current position of the motor vehicle is transferred by the motor vehicle to the vehicle-external unit of the parking garage. In another method step, the current temperature and humidity for the position of the motor vehicle is determined by using the measuring results from the measuring points and/or interpolating in the vehicle-external unit. Then, the temperature and humidity for the position of the motor vehicle are transferred by the vehicle-external unit to the motor vehicle. Finally, the parameters for the distance measurement by the ultrasonic sensors are adapted by using the transferred temperature and humidity. In so doing, a transmission sound pressure and/or a reception sensitivity, and/or a determination of the speed of sound can be adapted by the transferred environmental temperature from the ultrasonic sensors.

The driver therefore first drives the motor vehicle to a parking garage that assists with automatic vehicle drop-off and provision and transfers the motor vehicle to a specific transfer point, i.e., the drop-off site. At this point, the motor vehicle establishes a safe connection with the parking garage's own server (vehicle-external unit) by means of a WLAN/WiFi link. The vehicle-external unit transfers the target position to the motor vehicle at which the motor vehicle is supposed to be parked. The motor vehicle assistance system then plans a trajectory from the transfer point to the target position and then automatically drives this trajectory. During the trip from the transfer point to the target position, the motor vehicle assistance system acquires objects by means of the installed ultrasonic sensors. Once an object has been recognized that is located on the planned trajectory, the trajectory is planned around the object. If this is impossible, the motor vehicle brakes to a standstill and reports the disruption to the vehicle-external unit of the parking garage. While driving the trajectory, the motor vehicle assistance system ascertains the position relative to the drop-off site by using odometry and environmental sensors, and transfers it to the vehicle-external unit of the parking garage. By means of different temperature and humidity measuring points, the vehicle-external unit of the parking garage is capable of ascertaining by interpolation the temperature and humidity at any location within the parking garage, or at least within the specific area for operating the automatic vehicle drop-off/provision function. In addition or alternatively, the temperature and humidity measurement can be performed by an air-conditioning system in the parking garage. The vehicle-external unit of the parking garage thereby determines the current temperature and humidity at the current position of the motor vehicle, and transfers this data to the motor vehicle. The motor vehicle assistance system adapts the distance measurement by the ultrasonic sensors by using the current temperature and humidity.

In an alternative embodiment, the motor vehicle sends the vehicle-external unit the planned trajectory and not its position. This processing unit then ascertains the temperature and humidity along the planned trajectory at the motor vehicle. If the trajectory is adapted by the assistance system, then the new trajectory is transferred to the vehicle-external unit, upon which the processing unit transfers the temperature and humidity along the new planned trajectory to the motor vehicle. The current position of the motor vehicle can alternatively be transferred with GPS coordinates to the vehicle-external unit of the parking garage. In an alternative embodiment, the temperature and humidity are ascertained at the position of the motor vehicle in the motor vehicle assistance system, and not in the vehicle-external unit. In this case, the measuring results as well as the position of the measuring points are transferred directly by the vehicle-external unit to the motor vehicle assistance system. In some embodiments, the measuring points for the temperature and humidity are installed in the parking garage at a typical installation height for ultrasonic sensors in a motor vehicle. The typical installation height can for example lie between 300 mm and 500 mm above the floor of the parking garage. This ensures that the temperature in the environment of the ultrasonic sensors can be optimally determined. In further embodiments, the area for automatic vehicle drop-off and provision consists of a plurality of parking garage levels. Measuring points are mounted on all levels of the parking garage. By using the position or trajectory which is ascertained by the assistance system, the vehicle-external unit ascertains the level on which the motor vehicle is located and ascertains the current temperature and/or humidity of the motor vehicle environment by using the relevant measuring points. In addition or alternatively and in corresponding embodiments, the motor vehicle assistance system can ascertain the parking garage level on which the motor vehicle is located by using odometry and/or motor vehicle tilt sensors, and can transfer this information to the vehicle-external parking garage unit.

In alternative embodiments, the area for automatic vehicle drop-off and provision consists of a non-public segregated area in the parking garage. Motor vehicles can only enter this area through a lock. This is beneficial since the air exchange in such an area is slight, and the temperature and humidity in this area accordingly does not change abruptly for the automatic driving function, i.e., the automatic driving maneuver or the automated maneuvering procedure. Moreover, it is possible to work with significantly fewer measuring points for the temperature and humidity measurement. At least one measuring point is located within the lock, one in the middle of the area, and one at a point furthest from the lock. If there are other accesses to the public segregated area in the parking garage, for example through doors, they should also be equipped with a measuring point.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. A computer program (code) may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A motor vehicle for improved parking maneuvering in a parking garage, comprising at least:
   one or more climate-dependent sensors for determining at least one distance from the motor vehicle to one or more objects in an environment of the motor vehicle; and
   a controller, connected with the one or more climate-dependent sensors and adapted for communication with a vehicle-external parking processing circuit of the parking garage over a communication link; wherein
   the controller is configured to receive climate-specific measured data of the parking garage from the vehicle-external parking processing circuit and to calibrate the one or more climate-dependent sensors based on the received climate-specific measured data; wherein the controller is configured to calibrate the one or more climate-dependent sensors by adapting one or more of a sensor sensitivity, at least one parameter of the sensor, and a transmission sound pressure of the sensor.

2. The motor vehicle of claim 1, wherein the motor vehicle is further configured to, during the parking maneuvering in the parking garage, operate in an autonomous driving mode, in which autonomous driving mode the motor vehicle moves autonomously.

3. The motor vehicle of claim 1, further comprising a position acquisition circuit, configured to determine a current position of the motor vehicle, wherein
   the position acquisition circuit is furthermore configured to transmit the acquired current position of the motor vehicle to the vehicle-external parking processing circuit; and wherein
   the received climate-specific measured data is associated with the current position of the motor vehicle in the parking garage.

4. The motor vehicle of claim 3, wherein the controller is further configured to:
   receive a predetermined parking position from the vehicle-external parking processing circuit; and to
   based on the predetermined parking position, determine a trajectory from the current position of the motor vehicle to the predetermined parking position along which the motor vehicle is guided to the predetermined parking position.

5. The motor vehicle of claim 4, wherein the controller is further configured to transmit the trajectory to the vehicle-external parking processing circuit and to receive the climate-specific measured data from the vehicle-external parking processing circuit, which climate-specific measured data is associated with measuring points along the trajectory.

6. The motor vehicle of claim 3, wherein the position acquisition circuit comprises an odometry sensor and/or a steering wheel angle sensor.

7. The motor vehicle of claim 3, wherein the position acquisition circuit is furthermore configured to determine the level of the parking garage on which the motor vehicle is located, wherein the position acquisition circuit comprises a tilt sensor to determine the level of the parking garage.

8. The motor vehicle of claim 1, further comprising a position acquisition circuit, configured to determine a current position of the motor vehicle, wherein the controller is configured to position-associate the received climate-specific measured data with the current position of the motor vehicle and to calibrate the one or more climate-dependent sensors based on the position-associated climate-specific measured data.

9. The motor vehicle of claim 1, wherein the one or more climate-dependent sensors comprise ultrasonic sensors.

10. A system for improved parking maneuvering of at least one motor vehicle in a parking garage, comprising:
    a vehicle-external parking processing circuit, adapted for communication with at least one controller of the at least one motor vehicle; and
    a plurality of measuring sensors, which are arrangeable in the parking garage in a spaced relationship to each other and are associated with a defined location, wherein the plurality of measuring sensors are configured to acquire climate-specific measured data within the parking garage; wherein
    the one or more measuring sensors are connected with the vehicle-external parking processing circuit and are configured to transmit the acquired climate-specific measured data to the vehicle-external parking processing circuit; and wherein
    the vehicle-external parking processing circuit is configured to send a signal to the at least one controller to initiate calibration of one or more climate-dependent sensors of the at least one motor vehicle and to transmit at least some of the climate-specific measured data to the at least one controller for the calibration.

11. The system of claim 10, wherein the one or more measuring sensors each comprise one or more of a temperature sensor and a humidity sensor.

12. The system of claim 10, wherein the one or more measuring sensors are arranged in the parking garage at an installation height between 300 mm and 500 mm from the floor of the parking garage on which the at least one motor vehicle is drivable.

13. The system of claim 10, wherein the vehicle-external parking processing circuit is further configured to:
receive a current position of the at least one motor vehicle in the parking garage;
determine climate-specific measured data that are associated with the current position of the at least one motor vehicle in the parking garage; and to
transmit the climate-specific measured data that are associated with the current position of the at least one motor vehicle to the at least one motor vehicle.

14. The system of claim 13, wherein the vehicle-external parking processing circuit is configured to determine the climate-specific measured data that are associated with the current position of the at least one motor vehicle in the parking garage by interpolation based on the acquired climate-specific measured data based on location data of the one or more measuring sensors.

15. The system of claim 10, wherein the vehicle-external parking processing circuit is further configured to:
transmit a predetermined parking position to the at least one motor vehicle;
receive a trajectory from the at least one motor vehicle, the trajectory providing a path from the current position of the motor vehicle to the predetermined parking position along which the motor vehicle is guided to the predetermined parking position;
determine climate-specific measured data that are associated with measuring sensors along the trajectory of the at least one motor vehicle in the parking garage; and to
transmit the climate-specific measured data that are associated with the measuring sensors along the trajectory to the at least one motor vehicle.

16. The system of claim 10, wherein the system is installed in a parking garage.

17. A system, comprising:
a vehicle-external parking processing circuit;
one or more measuring points, which are arrangeable in the parking garage and which are configured to acquire climate-specific measured data of the parking garage; and
a motor vehicle, the motor vehicle comprising at least:
one or more climate-dependent sensors for determining at least one distance from the motor vehicle to one or more objects in an environment of the motor vehicle; and
a controller, connected with the one or more climate-dependent sensors and adapted for communication with the vehicle-external parking processing circuit of the parking garage over a communication link; wherein
the one or more measuring points are connected with the vehicle-external parking processing circuit and are configured to transmit the acquired climate-specific measured data to the vehicle-external parking processing circuit;
the vehicle-external parking processing circuit is configured to transmit at least some of the climate-specific measured data to the at least one controller of the at least one motor vehicle; and wherein
the controller is configured to receive the climate-specific measured data of the parking garage from the vehicle-external parking processing circuit and to calibrate the one or more climate-dependent sensors based on the received climate-specific measured data; wherein the controller is configured to calibrate the one or more climate-dependent sensors by adapting one or more of a sensor sensitivity, at least one parameter of the sensor, and a transmission sound pressure of the sensor.

* * * * *